July 15, 1930.  W. TURNER  1,770,679
EARTHWORKING APPARATUS
Original Filed Dec. 26, 1924   4 Sheets-Sheet 1
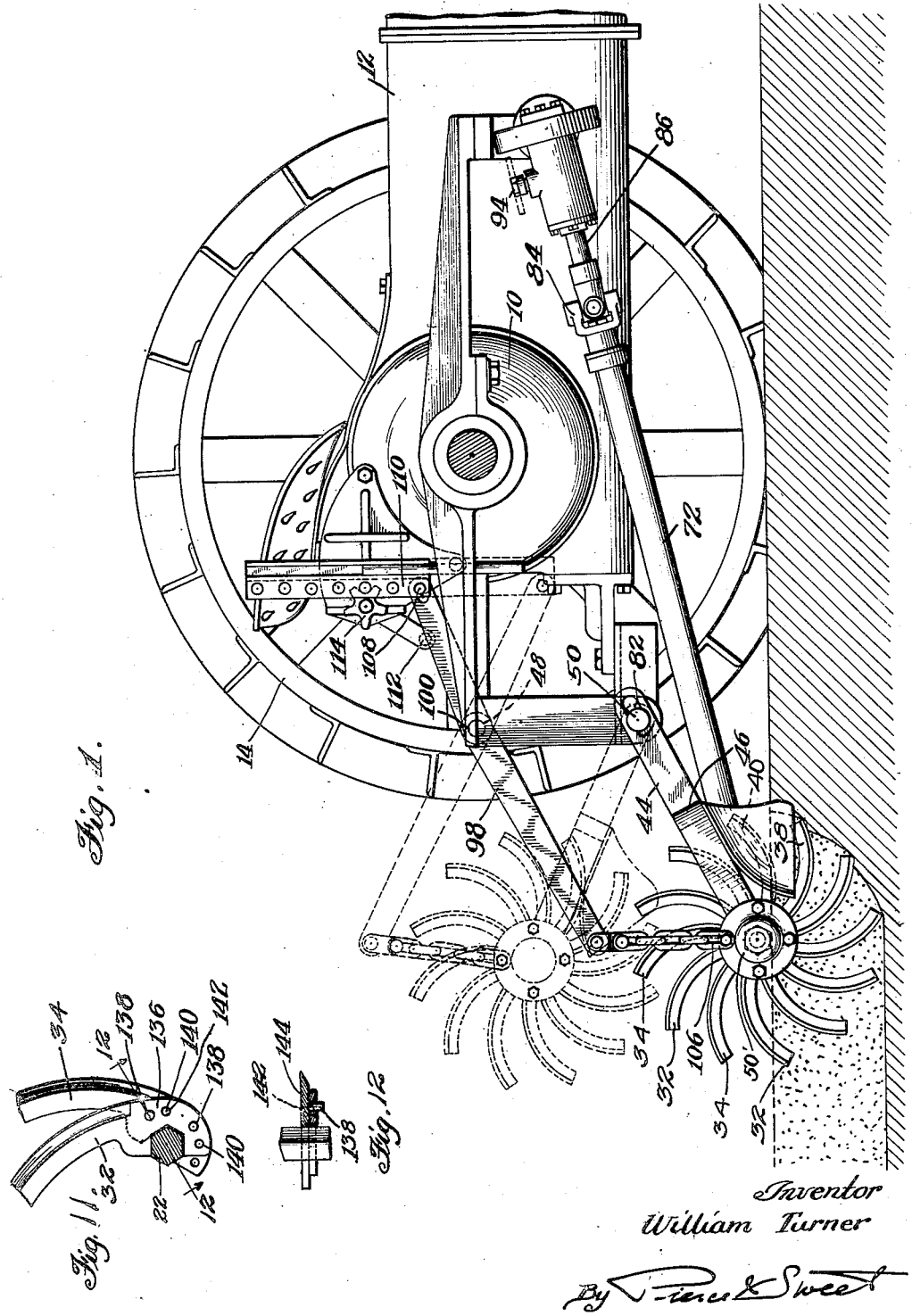
Inventor
William Turner
By Pierce & Sweet
attys

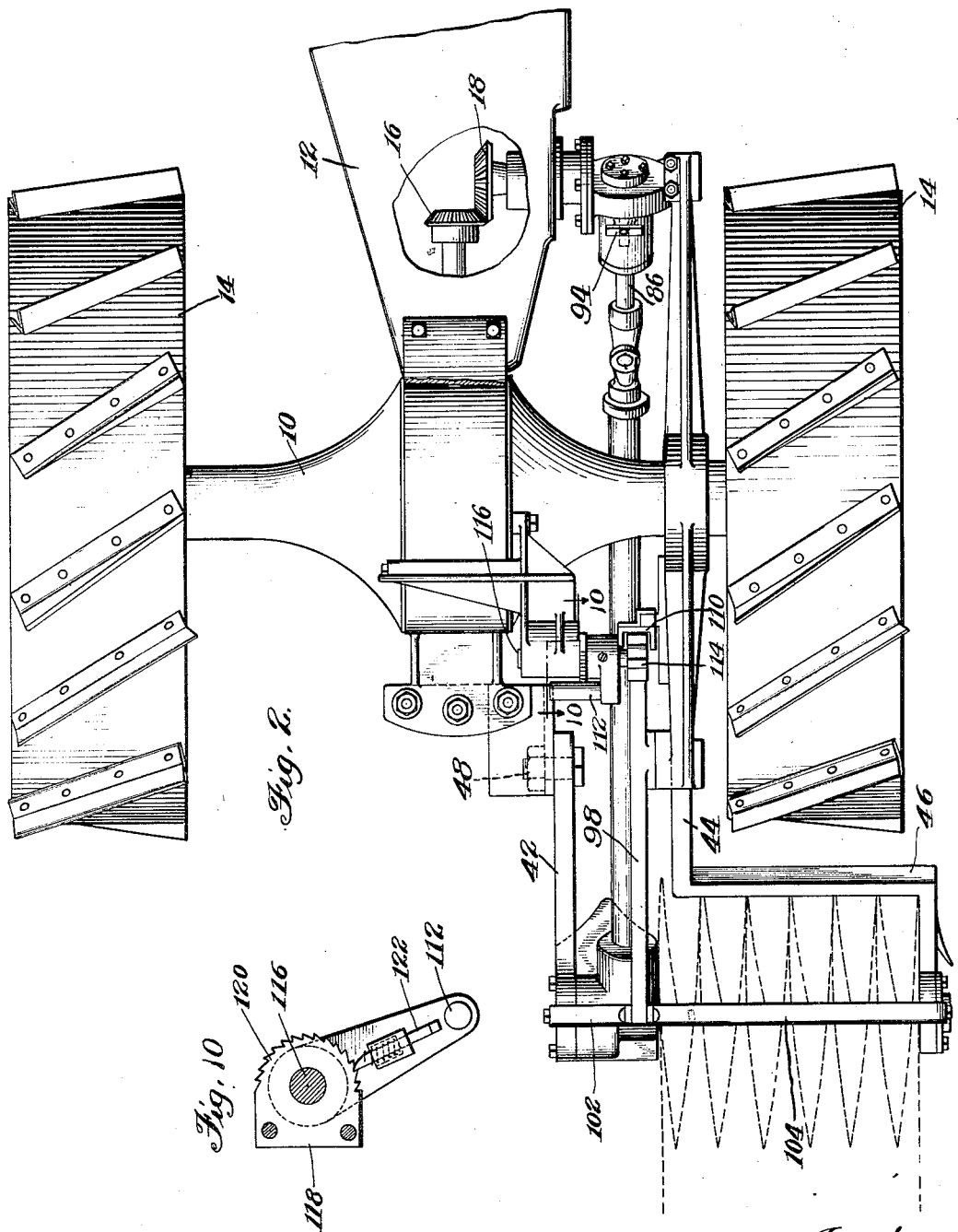

July 15, 1930.  W. TURNER  1,770,679
EARTHWORKING APPARATUS
Original Filed Dec. 26, 1924   4 Sheets-Sheet 3
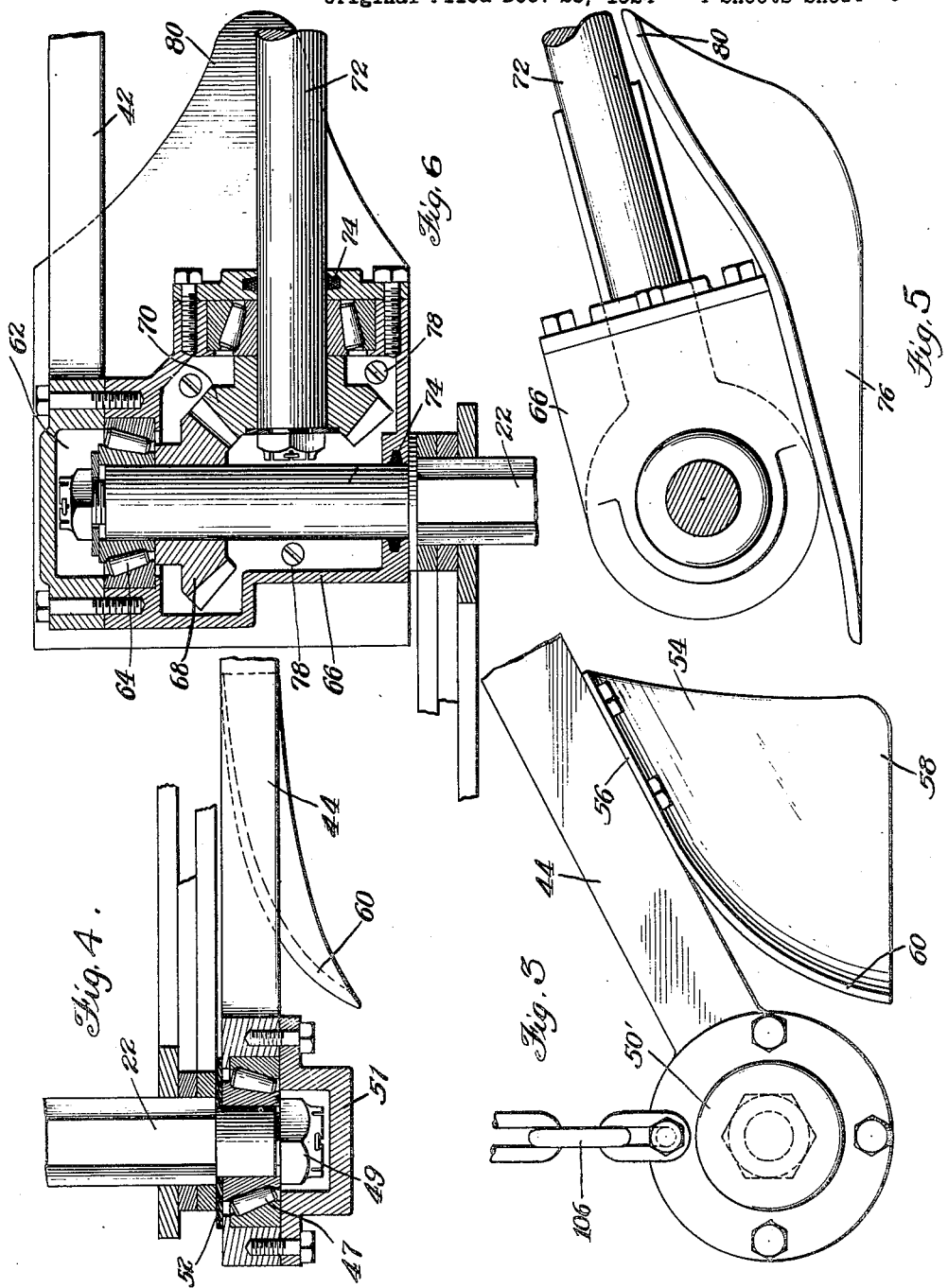
Inventor
William Turner
By Pierce & Sweet
Attys

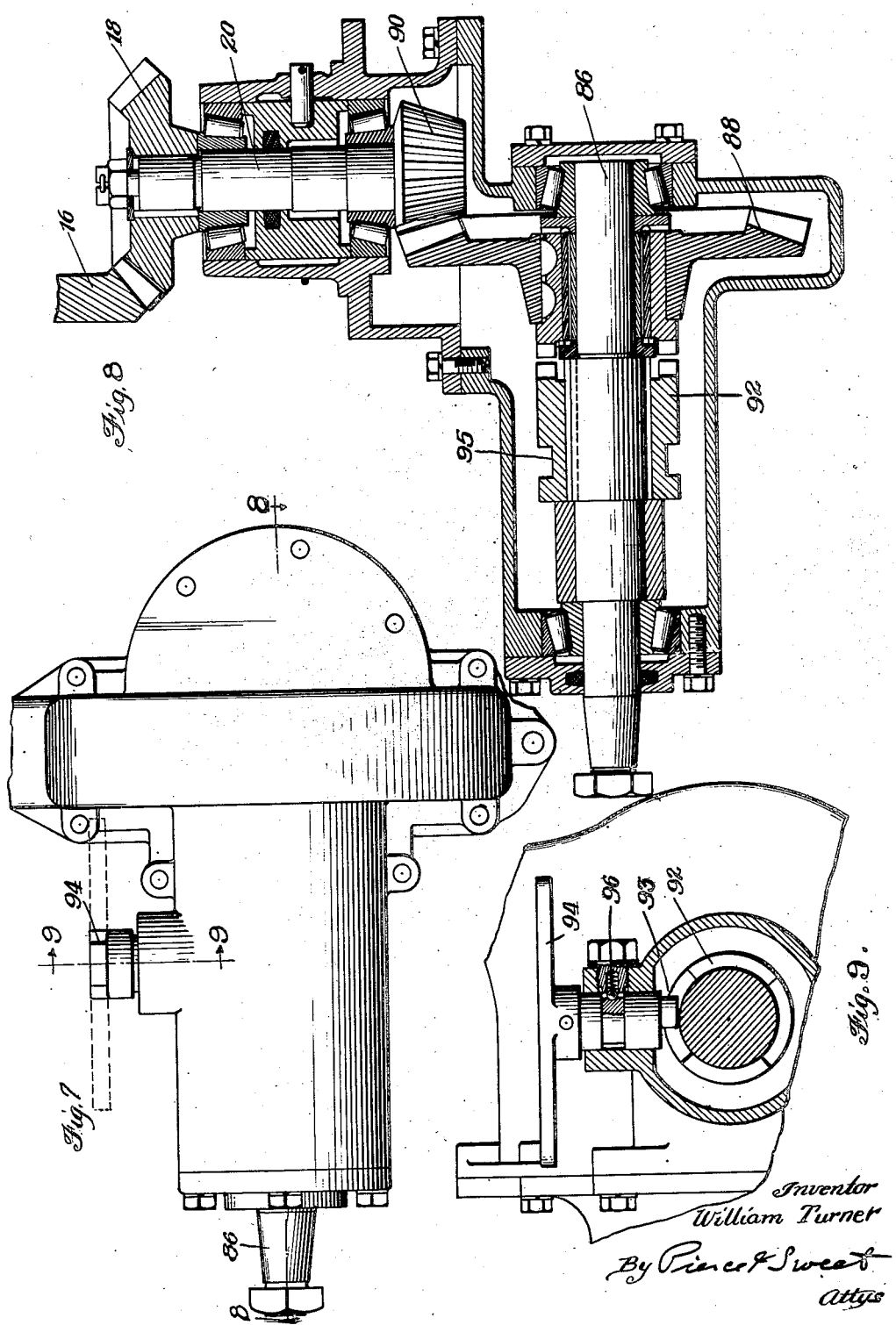

Patented July 15, 1930

1,770,679

UNITED STATES PATENT OFFICE

WILLIAM TURNER, OF CHICAGO, ILLINOIS, ASSIGNOR TO TURNER ROTARY PLOWS, OF CHICAGO, ILLINOIS, A COMMON-LAW TRUST

EARTHWORKING APPARATUS

Application filed December 26, 1924, Serial No. 758,161. Renewed November 26, 1929.

My invention relates to earth working, and more specifically to an improved means for preparing soil as nearly as possible ready for sowing in a single operation.

Among the primary objects and uses of the invention may be enumerated:

First, the breaking up and the lightening of the soil completely in a single operation, leaving the surface sufficiently smooth for the sowing of ordinary crops.

Second, reduction of the power in-put to the working tool to a minimum coupled with recovering as much of this power as possible in the form of thrust assisting the unit to traverse the soil.

Third, reducing the loads between the cutting elements and the source of power by working on earth as close as practicable to the axis of rotation of the tool.

Fourth, elimination of over-lap or successive cuts.

Fifth, convenience in changing the width of cut and the depth of cut.

Further objects and advantages, including quick detachable connections for the convenient removal and replacement of bent or broken knives, will be apparent as this description proceeds.

In the accompanying drawings:

Fig. 1 is a side elevation of a portion of a tractor illustrating the application thereto of earth working means according to the invention.

Fig. 2 is a plan view of the parts shown in Fig. 1 with the earth working element proper indicated diagrammatically.

Fig. 3 is a side view of the tracking shoe and associated parts.

Fig. 4 is a plan view of the same parts with the end bearing in section.

Fig. 5 is a side view of the depth shoe, and the other end of the working element.

Fig. 6 is a plan view of the same parts with the bearings and gear housing in section.

Fig. 7 is a side view of part of the transmission to the working element.

Fig. 8 is a central section through the same transmission.

Fig. 9 is a section on line 9—9 of Fig. 7.

Fig. 10 is a detail section on line 10—10 of Fig. 2.

Fig. 11 is a side elevation of a form of blades mounting.

Fig. 12 is a section on line 12—12 of Fig. 11.

The embodiment of the invention selected for illustration has been shown in connection with a tractor of any suitable or preferred type, including a rear axle housing 10 and a body housing 12 integral therewith. The rear axle carries the usual drive wheel 14, and the earth working element may be driven by any suitable power take-off, such as bevel gears 16 and 18, driving the laterally extending shaft 20, from which power may be transmitted to the working element. Gear 16 turns at engine speed independent of any change speed mechanism in the rear axle housing. As power take off means of this type are well known in the art and per se constitute no part of the present invention, description of the details thereof is deemed unnecessary.

Referring now to Figs. 1 and 11, the working element proper comprises a central polygonal shaft 22, in this instance having six sides, and a plurality of knives fastened thereon.

The working element shown has the knives extending in twelve different directions. To form all the knives in quantity at small cost, it is only necessary to form one set of blades like the blade 32 in Fig. 11 and another set with the hexagonal end opening rotated 30°. Thus the knives numbered 32 in Fig. 1 will all be duplicates, while those numbered 34 will be formed from the other set of blanks.

As indicated in Fig. 1, the operation performed on the earth consists in moving shaft 32 forward slowly while rotating it at a relatively rapid rate so that the knives slice through the soil to a suitable depth. The outer ends of the knives are arranged in a regular helix of several turns, in this instance about seven. Considering the earth being acted upon by the knives 38 in Fig. 1 it will be noted that six other knives are cutting through in the same radial position, but that these knives are spaced far enough apart not to choke and move the entire mass, but to slice through the same without material displacement thereof.

The circumferential space between each knife 38 and the following knife 40, is sufficient for the earth to close in behind knife 38 before it is acted upon by knife 40, except close to the shaft 22 where the rapidly diminishing clearance between the blades constitutes the whole arrangement a solid, nobby roller that will float above the surface of the soil.

To facilitate passage of the knives through the soil, substantially without displacement of the mass of soil being acted upon as a whole, the knives are curved backward with respect to the direction of rotation as shown. This provides a cutting edge lying at an angle to the direction of motion to produce a slicing action. To make this action constant throughout the length of the knife, the knife should, of course, be curved as a logarithmic spiral, but the circular arc shown is a sufficiently close approximation for all practical purposes.

Upon reference to Fig 1, it will be noted that all the knives have their leading edges beveled the same way. This provides a slight lateral end thrust, which, when the angle is properly chosen, substantially off-sets the tendency of the knife to slip over into the relatively loose earth directly behind the preceding knife, so that the lateral end thrust received from the earth by the working element is substantially zero.

Referring now to Figs. 1 and 2, the working element as a whole is carried at its ends by the inner straight arm 42 and an outer arm 44, off-set at 46. Both arms are pivoted on the same axis on spaced pintles 48 and 50. Where the outer arm 44 engages the outer end of the working element, I position a roller bearing 47 with its outer race counter-sunk in the end of the arm, and its inner race fastened on the rounded end of the shaft 22 by a suitable nut 49.

A cap 51 provides a lubricant-tight housing for the bearing, and a washer 52, the primary function of which is to receive the thrust of tightening up the nut 49, preferably extends out into contact with the arm to complete the closure.

Bearing 47, with its housing, would drag in the dirt continually in the absence of some means to prevent such action. I have illustrated a tracking shoe 54 having a flange 56 bolted to the arm 44 and having a lower edge 58 curved laterally as at 60 to deflect earth lying in the path of the outer bearing. In addition to protecting the outer bearing, this shoe also performs the very useful function of producing surface markings across the field for the guidance of the operator in driving a straight furrow in the instant or a subsequent operation.

The arm 42 is also cupped at 62 to form a lubricant housing for the bearing 64, being bolted to a gear housing 66 holding the fixed race of said bearing. The shaft 22 carries a bevel 68 receiving power from a bevel 70, driven by the transmission shaft 72, and the shafts 22 and 72 are each provided with a suitable lubricant packing 74.

Underneath the housing 66 I provide a shoe 76 suitably bolted thereto as at 78. This shoe terminates in a central point 80, and the lower ground engaging surface thereof has a central prominence or rib, not unlike the breast of a water fowl, which tends to form a slight groove. The shoe, as a whole, will bear very heavily if depressed to any suitable depth, and thus constitutes a powerful means for limiting the depth of action of the element, as well as a protection for the housing.

The arms 42 and 44 are both slotted as at 82 to permit the use of a drive shaft 72 of constant length driven through the universal joint 84 from the transmission shaft 86, carrying rotatably mounted thereon the bevel 88 driven by the bevel 90 on the shaft 22. The shaft 86 may be clutched to the bevel 88 by a suitable splined clutch 92 under the control of the shifting element 94, having an eccentric toe 93, sliding in a groove 95. This element is conveniently positioned for actuation by the foot of the operator and is provided with suitable ratchet action means such as a spring pressed ball 96 tending to hold the clutch either completely engaged, or completely disengaged.

To withdraw the working element I provide a walking beam 98 suitably pivoted at 100 on the frame. The free end of the walking beam overlies the inner end of the working element and carries a short arm 102 extending inwardly, and a longer arm 104 extending outwardly. Chains 106 carry the ends of the working element from supporting arms 102 and 104. The inner end of the walking beam has slotted connection at 108 with a vertical slide 110 operable by means of the hand crank 112 through the pinion 114. The shaft 116 carrying this pinion (see Fig. 17) is journaled in a fixed plate 118 having a serrated periphery at 120. The stop latch 122 is spring held to limit clockwise rotation of the crank 112. To remove the element to the dotted line position of Fig. 1 the crank 112 is swung well into the upper quadrant.

In Fig. 11 the blade head 136 carries dowel pins 138 to enter registering holes in the next head, and is apertured at 140 to receive the dowel pins 142 carried by the head 144 back of it. Upon a little axial loosening of nut 49 a broken blade can be separated axially enough to clear the dowel connections.

Without further elaboration, the foregoing will so fully explain the gist of my invention, that others may, by applying current knowledge, readily adapt the same for use under various conditions of service without eliminating certain features which may properly be said to constitute the essential items of novelty intended to be defined and secured to me by the following claims.

I claim:

1. The combination with a vehicle having a rear axle, a rear axle housing and a power take-off in front of said axle, of an earth-working element behind said rear axle, journals for said element permitting it to rotate about an axis substantially horizontal and perpendicular to the line of motion of said vehicle, said element generating a forward thrust by engagement with the earth, a connection between said journals and said vehicle for supporting said journals, said connection comprising a member extending from each journal forwardly and upwardly, a pivot mounting on said vehicle for the front end of each member, said mounts all pivoting about the same transverse axis, and manually operated flexible means for lifting said bearings to limit the engagement of the tool with the earth or withdrawing it therefrom, a driving connection extending from said power take-off back below said axle to rotate said tool, said driving connection including a rotary drive shaft capable of transmitting thrust, a universal joint connecting the front end of said shaft to said power take-off, and bevel gearing at the rear end of said shaft for driving said element, said forwardly and upwardly extending members being connected so as to leave the tool free to move longitudinally and thereby deliver its thrust to said drive shaft.

2. The combination with a vehicle having a rear axle and ground gripping drive wheels at the ends thereof, of a power take-off in front of said axle, a drive shaft driven by said take-off and extending rearwardly below and beyond said rear axle between said drive wheels and near one of them, a transverse shaft extending from the rear end of said drive shaft across behind the adjacent drive wheel, bevel gearing for driving said transverse shaft from said drive shaft, cutting knives mounted on said transverse shaft, inner and outer journals for the ends of said transverse shaft, spaced arms pivoted on transverse pintles on the rear of said vehicle, one arm extending directly rearwardly and downwardly to support the inner journal, and another arm offset to reach and support the outer journal, a shoe for each journal, said shoes dragging in the dirt to protect said journals and help support them, the inner shoe being larger and shaped to ride in soft dirt, and the outer shoe having a plow shape to form a furrow in either dirt or sod, and manually adjustable flexible tension means for limiting downward movement of said journals, said arms and drive shaft constituting two different connections between said vehicle and said transverse shaft, one of said connections being adjusted to resist the forward thrust, and the other having lost motion to relieve it of said thrust, said drive shaft having a universal joint at its front end to permit said transverse shaft to move up and down, the pintles for said arms being spaced to clear said drive shaft when said transverse shaft is elevated.

3. The combination with a vehicle having a rear axle and drive wheels at the ends thereof, of a power take-off in front of said axle, a drive shaft driven by said take-off and extending rearwardly below and beyond said rear axle between said drive wheels and near one of them, a transverse shaft extending from the rear end of said drive shaft across behind the adjacent drive wheel, means for supporting said transverse shaft from the vehicle, means connecting said drive shaft with said transverse shaft, and earth working elements carried by said transverse shaft.

4. The combination with a vehicle having a rear axle and drive wheels at the ends thereof, of a power take-off in front of said axle, a drive shaft driven by said take-off and extending rearwardly below and beyond said rear axle, a transverse shaft extending from the rear end of said drive shaft across behind the adjacent drive wheel, bevel gearing for driving said transverse shaft from said drive shaft, cutting knives mounted on said transverse shaft, and means for supporting said transverse shaft from the vehicle.

5. The combination with a vehicle having a rear axle and drive wheels at the ends thereof, of a rotary low element located at one side behind one of said wheels, means for supporting said element on said vehicle and for adjusting it vertically, power transmission means for rotating said element to pulverize the earth, said element having blades moving rearwardly through the earth, means forming part of said power transmission for delivering thrust from said element to the vehicle, said power transmission extending forward under said rear axle and being connected to said vehicle at a point lower than said axle.

In witness whereof, I hereunto subscribe my name this 18th day of December, 1924.

WILLIAM TURNER.